United States Patent [19]

Campbell

[11] Patent Number: 4,496,888

[45] Date of Patent: Jan. 29, 1985

[54] CONTROL SYSTEM FOR A D.C. MOTOR

[75] Inventor: Graeme R. Campbell, West Midlands, England

[73] Assignee: Lucas Industries Limited, Birmingham, England

[21] Appl. No.: 454,660

[22] PCT Filed: Dec. 4, 1978

[86] PCT No.: PCT/GB78/00046
§ 371 Date: Jul. 23, 1979
§ 102(e) Date: Jul. 23, 1979

[87] PCT Pub. No.: WO79/00355
PCT Pub. Date: Jun. 28, 1979

Related U.S. Application Data

[63] Continuation of Ser. No. 224,224, filed as PCT GB 78/00046 Dec. 4, 1978, published as WO 79/00355, Jun. 28, 1979, § 102(e) date Jul. 23, 1979, abandoned.

[30] Foreign Application Priority Data

Dec. 8, 1977 [GB] United Kingdom ............... 51067/77
Dec. 4, 1978 [WO] PCT Int'l.
Appl. ................... PCT/GB78/00046

[51] Int. Cl.³ ............................................. H02P 3/12
[52] U.S. Cl. .................................. 318/284; 318/291; 318/293; 318/300
[58] Field of Search ............... 318/284, 285, 291, 293, 318/300

[56] References Cited

U.S. PATENT DOCUMENTS

| 3,230,435 | 1/1966 | Andrews | 318/284 |
| 3,564,365 | 2/1971 | Zelina | 318/300 X |
| 3,584,281 | 6/1971 | Reeves et al. | 318/284 X |
| 3,684,937 | 8/1972 | Reeves et al. | 318/300 X |
| 3,684,945 | 8/1972 | Hermansson et al. | 318/293 X |
| 3,818,310 | 6/1974 | Smith | 318/293 X |
| 4,025,830 | 5/1977 | Delaporte | 318/284 X |
| 4,162,436 | 7/1979 | Waldorf et al. | 318/332 X |
| 4,196,377 | 4/1980 | Boxer | 318/338 X |
| 4,234,834 | 11/1980 | Jennings | 318/285 |

FOREIGN PATENT DOCUMENTS 1918584 10/1969 Fed. Rep. of Germany .
1461760 11/1966 France .
1547019 12/1967 France .

Primary Examiner—B. Dobeck
Attorney, Agent, or Firm—Ladas & Parry

[57] ABSTRACT

A d.c. motor control system, intended primarily for use in battery powered vehicles, includes a control switch (RL2a, RL2b) for varying the connections of the motor field winding (24) to determine the mode of operation of the motor and speed interlock means for preventing said control switch being operated to change the motor mode while the motor is actually running. Instead of using a mechanical speed transducer the speed interlock means includes means for supplying current to the motor field winding (24) when current would not otherwise be flowing therethrough and means (BR1, T₁, P₁₆ etc.) connected to detect the voltage across the armature which occurs in these circumstances if the motor is in motion.

4 Claims, 9 Drawing Figures 4,496,888

CONTROL SYSTEM FOR A D.C. MOTOR

This is a continuation of application Ser. No. 224,224 filed as PCT GB 78/00046, Dec. 4, 1978, published as WO 79/00355, Jun. 28, 1979, § 102(e) dated July 23, 1979 now abandoned.

TECHNICAL FIELD

This invention relates to a control system for a d.c. motor.

BACKGROUND ART

Control systems have previously been proposed for electric vehicle motors in which there are interlocks between various driver operable controls and control devices in the control system to prevent damage to the system. For example, one such interlock may be provided to prevent a control device in the form of a contactor controlling the connection of the motor for reverse and forward motoring from being operated except when the vehicle is at rest. Such an interlock, which will be referred to hereinafter as "a speed interlock", necessitates the provision of means determining whether or not the vehicle is in motion.

In the previous proposals the control system has included a speed transducer which is used both for providing logic signals for use in the speed interlock functions and for providing analog signals for the control system. The speed transducer was a mechanical device driven by the traction motor and producing a pulse train, the frequency of which was proportional to speed. Such a transducer added considerably to the cost and complication of the control system and, being a mechanical device, required maintenance.

It is an object of the invention to provide a control system for an electric vehicle traction motor incorporating at least one speed interlock function but no mechanical speed transducer.

DISCLOSURE OF INVENTION

In accordance with the invention there is provided a control system for a d.c. motor comprising control means for varying the connections of the motor armature winding and/or field winding so as to enable the motor to operate in a plurality of different modes, and speed interlock means for preventing operation of said control means to change the motor connections from at least one mode to at least one other mode whilst the motor is running characterised in that said interlock means is sensitive to the voltage across the armature winding of the motor and means are provided for supplying a field current to the field winding when said interlock means is required to be operative.

Thus, when a change over from forward drive to reverse drive is demanded, for example, the speed interlock means will be required to be operative at a time when the field and armature currents would otherwise be zero. When it is required for the speed interlock means to be operative a current pulse is applied to the field winding. If the motor is at rest the voltage across the armature winding will be zero. If, on the other hand, the motor is running, a voltage signal will be generated by the motor which signal is detected and used to prevent the change-over.

Alternatively it can be arranged for the field current to have a predetermined minimum level below which it is never allowed to fall.

BRIEF DESCRIPTION OF DRAWINGS

An example of the invention as applied to an electrical vehicle d.c. traction motor control system is shown in the accompanying drawings in which.

BEST MODE OF CARRYING OUT THE INVENTION

Figure 1:
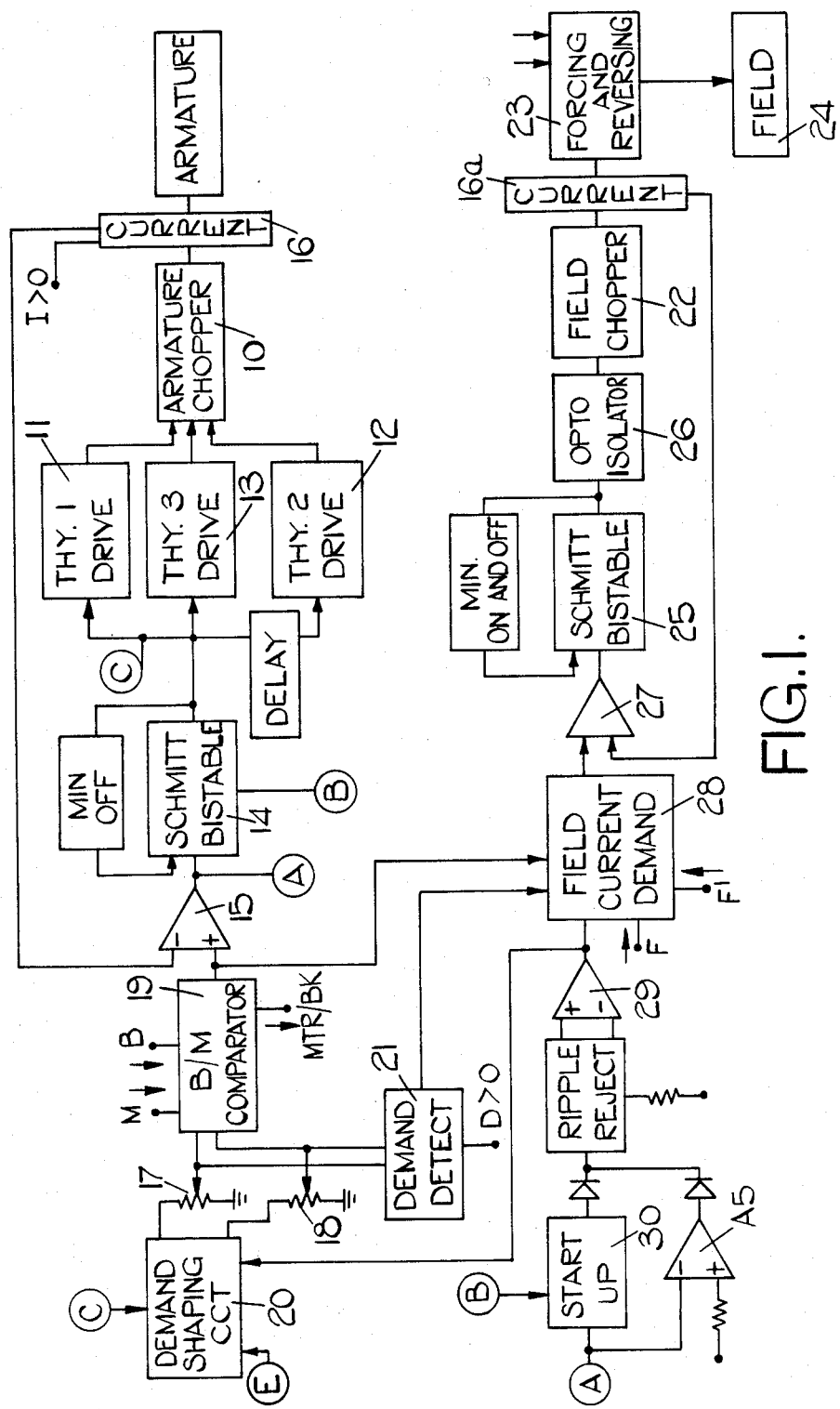
FIG. 1 is a block diagram of the armature and field winding current controls.
Figure 4:
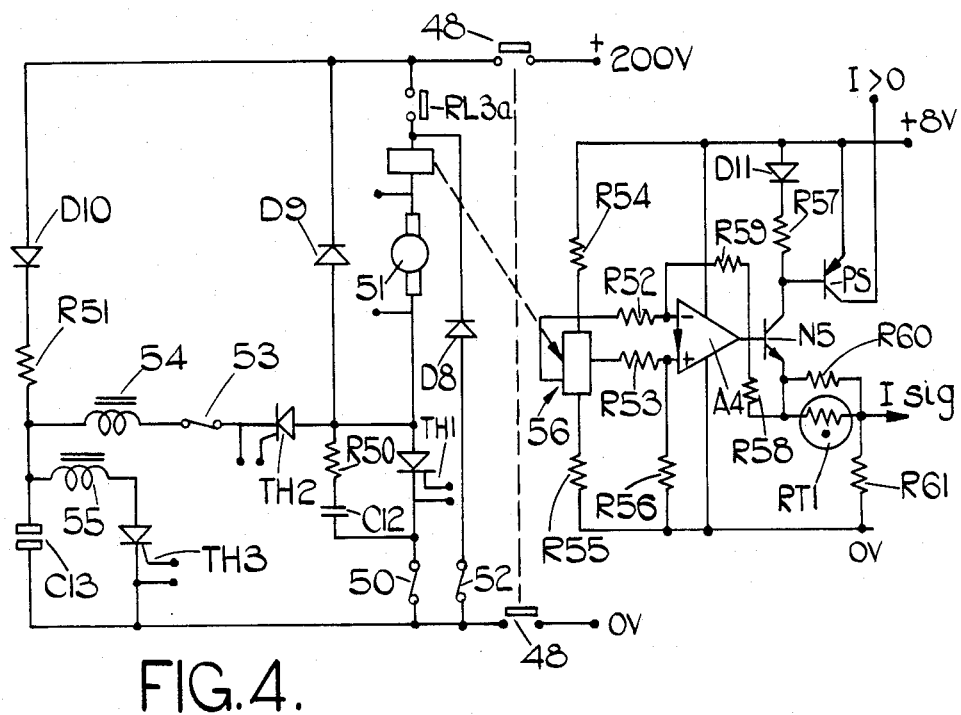
FIG. 4 is an electrical circuit diagram of an armature chopper circuit and current signal generator circuit forming part of FIG. 1.

Referring firstly to FIG. 1, the armature current control makes use of an armature chopper circuit 10 which is shown in detail in FIG. 4. Three thyristor drive circuits 11, 12, 13 control the chopper circuit 10, these drive circuits deriving their input from a Schmitt bistable circuit 14. This Schmitt bistable circuit 14 receives its input from a difference amplifier 15 which receives at one input terminal a signal representing the instantaneous armature current demand and at its other input terminal a current feedback signal from a current signal generating circuit 16. The current demand signal is generated by selecting the larger of two voltages on the sliders of two potentiometers 17, 18 operated respectively by accelerator and brake pedals controlled by the driver of the vehicle in which the system is installed. Such selection is carried out by a comparator circuit 19. The potentiometers 17, 18 are connected between respective output terminals of a demand shaping circuit 20 intended to reduce the maximum possible demand signals with increasing vehicle speed. In fact such shaping is carried out without the use of a mechanical speed transducer, signals already present in the system being used instead. This arrangement is described in detail in copending U.S. application number 224,222 of even date a common assignment herewith to which reference may be had for a full description of the circuit 20. A demand detector circuit 21 is also connected to the sliders of the potentiometers 17, 18 and provides a control signal to the field current control as well as an input to the logic circuit of FIG. 2.

The field current control includes a field chopper circuit 22 which supplies current via a forcing and reversing relay network 23 to the motor field winding 24. The field chopper circuit 22 is connected to a Schmitt bistable circuit 25 via an opto-isolator 26. The Schmitt bistable circuit receives a linear signal from a field current comparator 27 which receives one input from a field current demand signal generator 28 and another from a field current signal generator 16a. The field current demand signal generator 28 has inputs from the output of the comparator 19, from the demand detector 21, from various points in the logic circuit of FIG. 2 and also from a field weakening difference amplifier 29. This latter amplifier 29 receives inputs from a start up circuit 30 and from a further amplifier A5 which is operative during braking to compare the output of amplifier 15 with a fixed reference value.

Figure 2:
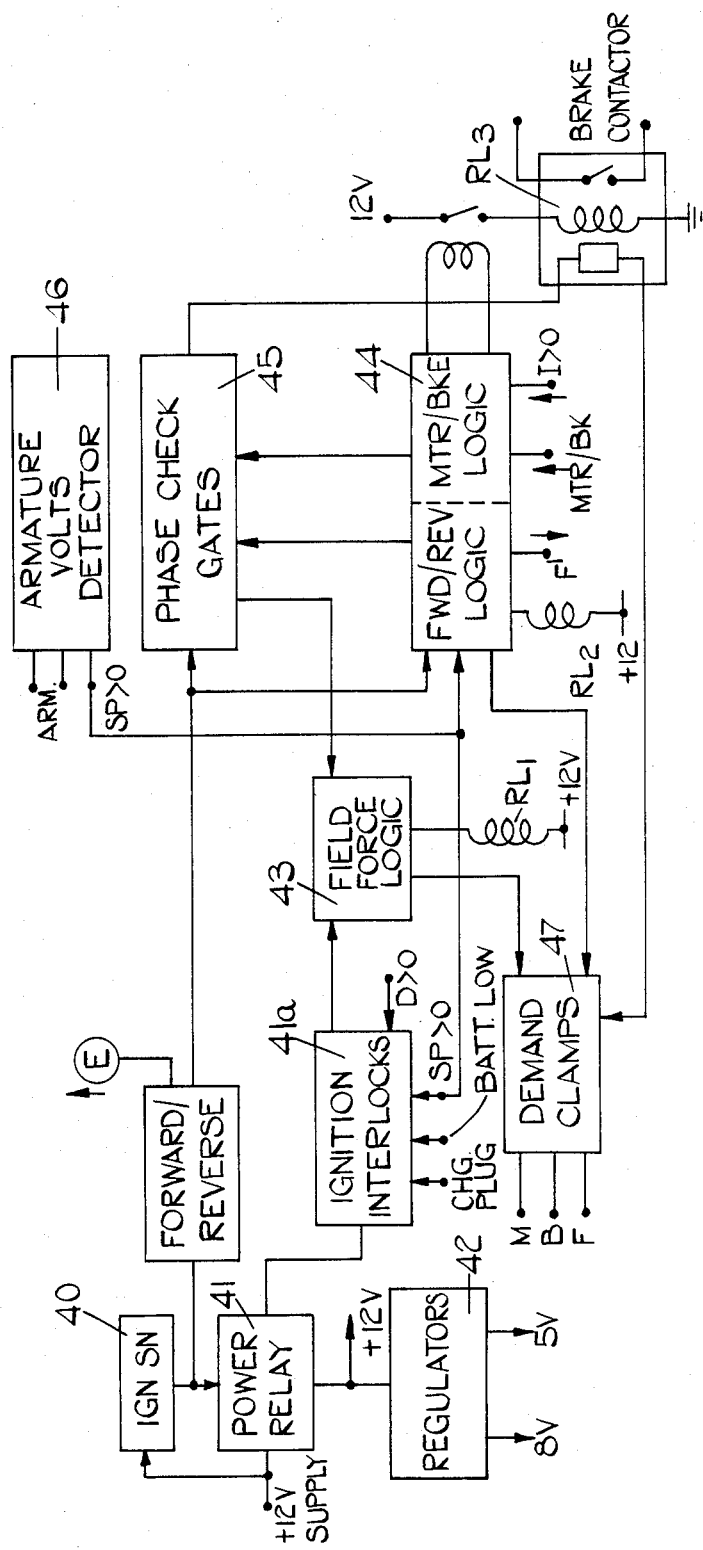
FIG. 2 is a block diagram of a logic circuit associated with the circuit of FIG. 1.

Before turning to the detailed circuit diagrams the block logic diagram of FIG. 2 will be briefly explained. Basically the function of the logic circuit is to control relays RL1 and RL2 in the field current control and a contactor RL3 in the armature current control, and also to control the sequence of events when the system is switched on and off, so that a properly controlled power up and power off sequence occurs. As ignition switch circuit 40 controls the supply of power to a power relay 41 which controls the supply of current to regulators 42 for supplying regulated voltages to the electronic control and logic circuits and also to a main isolator 48 (shown in FIG. 4). There are also various interlocks controlling the energising and deenergising of the power relay 41, such interlocks ensuring that the system cannot be brought into operation when the vehicle battery is on charge, when the 12V auxiliary battery is discharged, when the vehicle is moving or when there is an armature current demand signal present.

A block 43 in FIG. 2 represents a logic circuit (controlling the relay RL1) which is effective during change over between the various motor operating modes i.e. forward motoring, reverse motoring and braking, and serves to ensure that the field current is rapidly reduced to zero, before the newly selected mode is brought into operation. A logic circuit 44 controls the relay RL2 and the contactor RL3 and also provides inputs to phase check gates 45 which are responsible for bringing the field forcing logic 43 into operation. These gates detect the condition which occurs when the driver has selected a new mode of operation but the various conditions required for change-over have not yet been met.

For providing a speed logic input to the interlock circuit 41a and the logic circuit 44 there is an armature voltage detector 46 (shown in FIG. 7c) which is used instead of a speed transducer.

Finally FIG. 2 shows a demand clamping circuit 47 which receives inputs from the field force logic 43, the logic circuit 44 and from "proving" contacts on the contactor RL3, to control demand clamping signals applied to the comparator circuit 19, and the field current demand signal generator 28, during changes in mode of operation to prevent demand signals being generated at these times.

Figure 3:
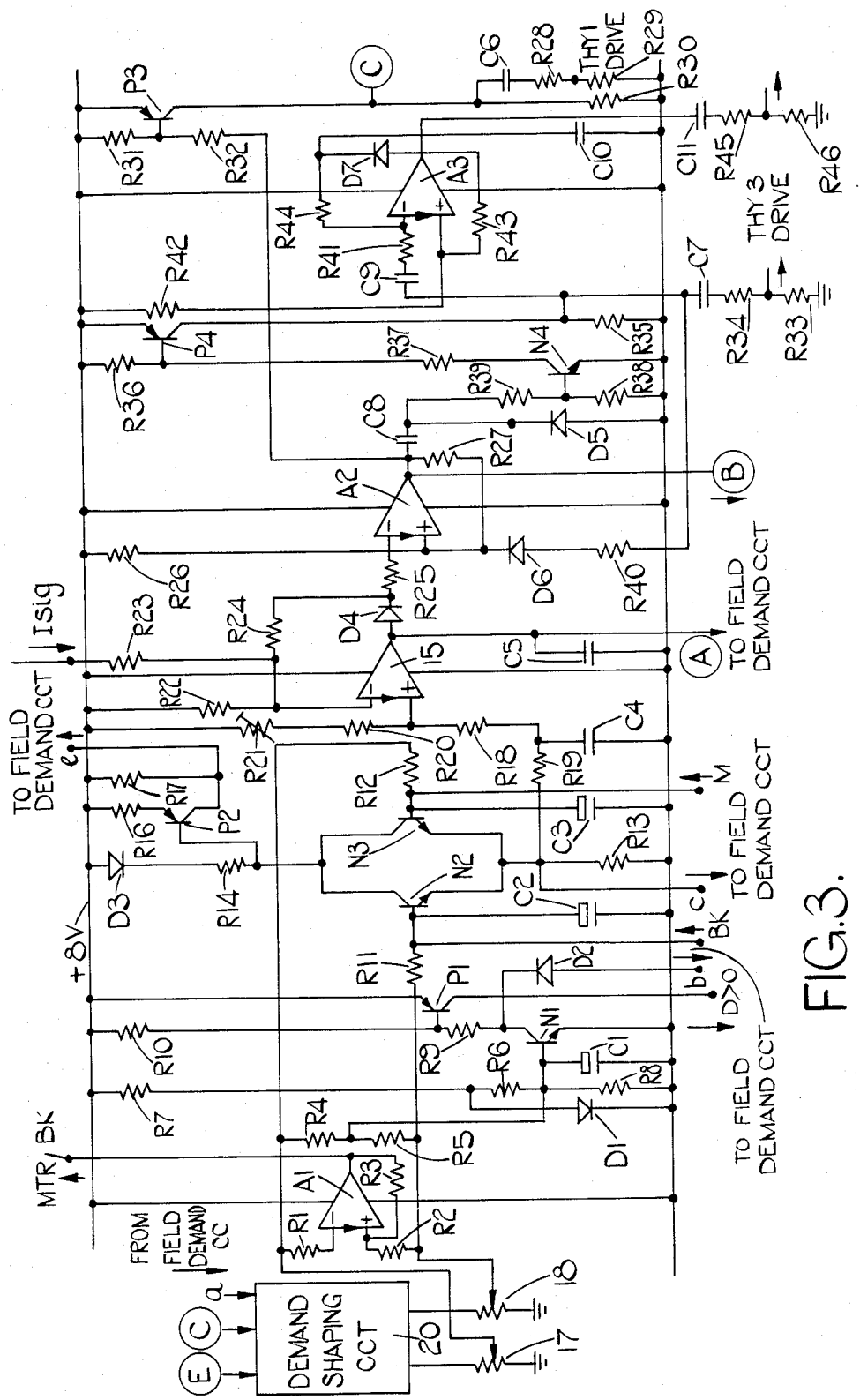
FIG. 3 is an electrical circuit diagram of the armature current control portion of FIG. 1.

Turning now to FIG. 3, the armature current control circuit includes the demand shaping circuit 20 which applies a maximum voltage appropriate to the existing vehicle speed to the non-earthed ends of the potentiometers 17 and 18. The comparator circuit 19 includes an operational amplifier A1 (which is a current differencing type operational amplifier such as ¼ National semiconductors type LM 3900). The sliders of the two potentiometers 17, 18 are connected by respective resistors $R_1$, $R_2$ to the inverting and noninverting input terminals of amplifier $A_1$. Hysteresis is provided by a feedback resistor $R_3$ to the non-inverting input terminal. The output terminal of amplifier $A_1$ is connected to a terminal marked MTR/BK which is connected to the logic circuit 44 and is at high voltage when the voltage on the slider of the brake potentiometer is higher than that on the slider of the accelerator potentiometer.

The demand detector 21 of FIG. 1 is represented by an npn transistor $N_1$ with its base connected to the common point of two resistors $R_4$ and $R_5$ connected in series between the sliders of the potentiometers 17, 18. The emitter of the transistor $N_1$ is connected to the earth rail of the supply and it is biased so as to be just non-conductive when there is a zero voltage at the sliders of both potentiometers 17, 18. The bias circuit for the transistor $N_1$ consists of a pair of resistors $R_6$, $R_7$ in series between the base of the transistor $N_1$ and the +8v supply rail, a resister $R_8$ connecting the base of the transistor $N_1$ to the earth rail and a diode $D_1$ with its anode connected to the common point of resistors $R_6$, $R_7$ and its cathode connected to the earth rail. A capacitor $C_1$ is connected between the base of the transistor $N_1$ and the earth rail. A very small voltage on the slider of either potentiometer 17 and 18 will suffice to turn on transistor $N_1$ which has its collector connected to the +8v rail by two resistors $R_9$, $R_{10}$ in series. The common point of these resistors $R_9$, $R_{10}$ is connected to the base of a pnp transistor $P_1$ which has its emitter connected to the +8v rail and its collector connected to a terminal marked D>O which is connected to interlock circuit 41. A diode $D_2$ connects the collector of the transistor $N_1$ to a terminal marked b (see FIG. 5).

The motor/brake comparator circuit 19 also includes an arrangement whereby only the larger of the two voltages at the sliders of the two potentiometers 17, 18 is passed on to the amplifier 15. This arrangement includes a pair of npn transistors $N_2$, $N_3$ with their bases connected by respective resistors $R_{11}$, $R_{12}$ to the sliders of the potentiometers 18 and 17 respectively. The emitters of these transistors $N_2$, $N_3$ are connected together and a common resistor $R_{13}$ connects them to earth. A pair of capacitors $C_2$, $C_3$ connect the bases of the transistors $N_2$, $N_3$ to the earth rail and the collectors of these transistors are connected together and via a common resistor $R_{14}$ to the cathode of a diode $D_3$, the anode of which is connected to the +8v rail.

It will be appreciated that only the transistor $N_2$ or $N_3$ which has its base at the higher voltage will conduct at any given time and that transistor will then act as an emitter follower, so that the voltage on the resistor $R_{13}$ will be just one $V_{be}$ below the voltage at the slider of the appropriate potentiometer. The resistors $R_{11}$ and $R_{12}$ and the capacitors $C_2$, $C_3$ act to limit the rate of change of the output voltage of the circuit, each R-C circuit having a time constant of some 70 mS. These also act as noise filters.

Figure 5:
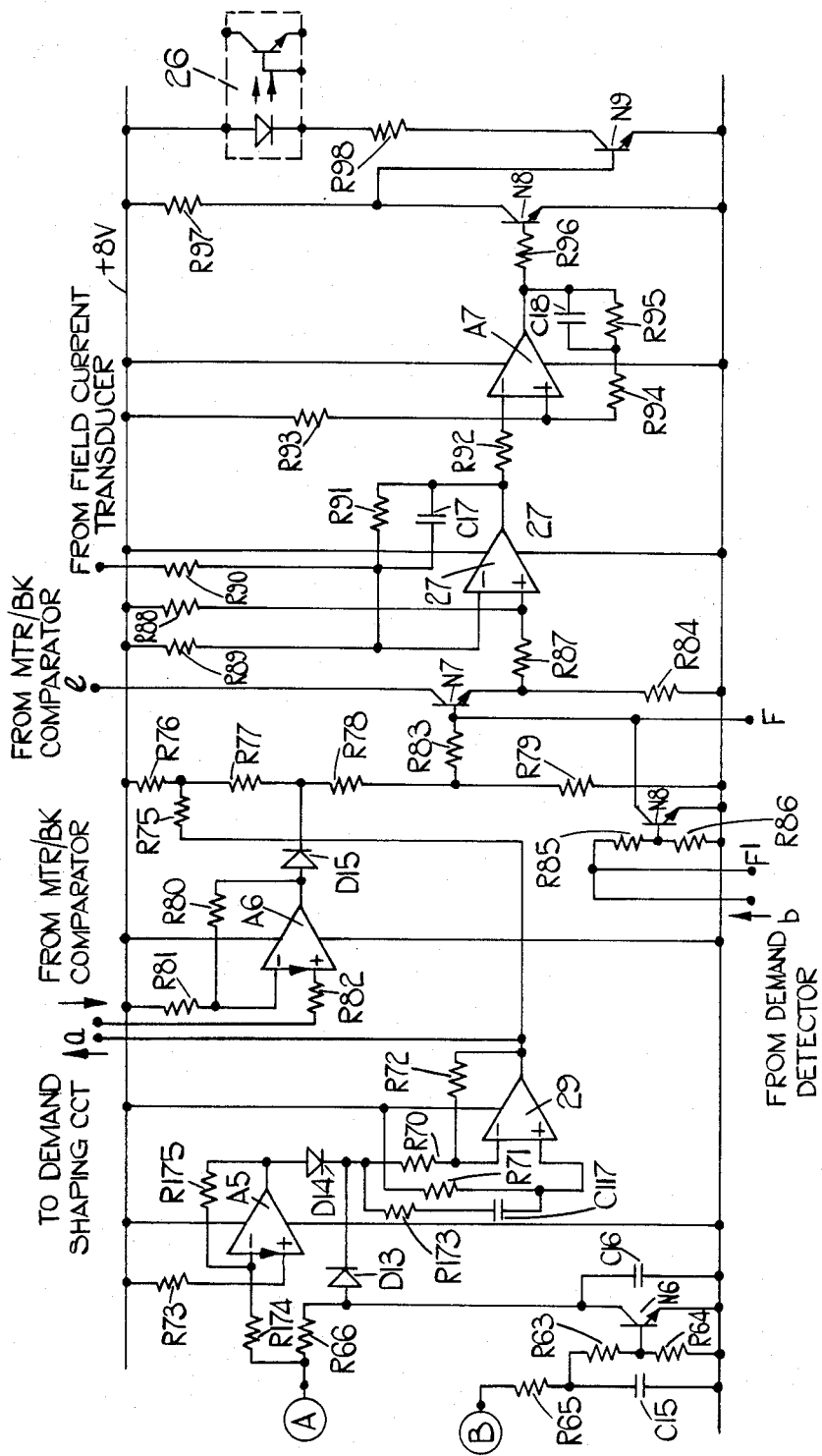
FIG. 5 is an electrical circuit diagram of a field current control circuit portion of FIG. 1.

Two terminals M and B of the demand clamp circuit 47 (see also FIG. 7b) are connected directly to the bases of the transistors $N_3$ and $N_2$ so that when the signals at these terminals are both low, the transistors are turned off. There are two output terminals c and e shown in FIG. 3. Terminal c is connected to the emitters of the transistors $N_2$ and $N_3$ and also to the field current control (FIG. 5). Terminal e is connected to the collector of a pnp transistor $P_2$ which has its base connected to the collectors of the transistors $N_2$ and $N_3$, its collector connected to the +8v rail by a resistor $R_{16}$ and its emitter connected to the same rail by a resistor $R_{17}$. Terminal e provides an input to the field current demand signal generator 28 (see also FIG. 5) and acts as a current source providing a current with a minimum level determined by $R_{17}$ and increasing linearly with the voltage at the emitter of the transistors $N_2$ and $N_3$.

The amplifier 15 which is another integrated circuit current differencing operational amplifier (e.g. ¼ LM 3900) is connected to operate as a linear difference amplifier. To this end the non-inverting input terminal of the amplifier 15 is connected by a resistor $R_{18}$ to the output of an R.C. filter circuit $R_{19}$, $C_4$ across the resistor $R_{13}$, and is also connected by a resistor $R_{20}$ and a variable resistor $R_{21}$ in to the +8v rail (to provide bias current). The inverting input terminal of amplifier 15 is connected by a bias resistor $R_{22}$ to the +8v rail and by a resistor $R_{23}$ to a terminal marked $I_{sig}$ from the current signal generator circuit 16 (see also FIG. 4). The output terminal of the amplifier 15 is connected by a capacitor $C_5$ to the earth rail and also to the anode of a diode $D_4$. The cathode of the diode $D_4$ is connected by a feedback resistor $R_{24}$ to the inverting input terminal of the amplifier 15.

The amplifier 15 produces an output signal which is linearly related to the error between the demanded armature current and the actual armature current as measured by circuit 16.

This error signal is applied via a resistor $R_{25}$ to the inverting input terminal of an operational amplifier $A_2$ on which the Schmitt bistable circuit 14 is based. The noninverting input terminal of the amplifier $A_2$ is connected to the +8 v rail by a bias resistor $R_{26}$ and normal feedback is provided via a resistor $R_{27}$ between the output terminal of the amplifier $A_2$ and its non-inverting input terminal to provide hysteresis (i.e. to set the switching threshold voltages above and below that determined by the biasing resistor $R_{26}$). The Schmitt bistable circuit has outputs to the three thyristor drive circuits 11, 12 and 13. The output to the thyristor drive circuit 11 is taken from the common point of the two resistors $R_{28}$ and $R_{29}$ in series between the earth rail and one side of a capacitor $C_6$. The other side of capacitor $C_6$ is connected to the collector of a pnp transistor $P_3$ which has its emitter connected to the +8v rail, its collector connected by a load resistor $R_{30}$ to the earth rail and its base connected to the common point of two resistors $R_{31}$, $R_{32}$ connected in series between the +8v rail and the output terminal of the amplifier $A_2$. The transistor $P_3$ turns on when the output of the amplifier $A_2$ is low so that there is a positive going output pulse delivered to drive circuit 11 when the output of amplifier $A_2$ goes low. This occurs when the actual armature current falls below the demand current by more than the margin established by the hysteresis of the Schmitt bistable.

The input to the drive circuit 13 is taken from the common point of two resistors $R_{33}$ and $R_{34}$ connected in series between the earth rail and one side of a capacitor $C_7$. The other side of the capacitor $C_7$ is connected to the collector of a pnp transistor $P_4$, the emitter of which is connected to the +8v rail and the collector of which is connected by a load resistor $R_{35}$ to the earth rail. The base of the transistor $P_4$ is connected to the common point of two resistors $R_{36}$, $R_{37}$ connected in series between the +8v rail and the collector of an npn transistor $N_4$, the emitter of which is connected to the ground rail. The base of the transistor $N_4$ is connected to the common point of two resistors $R_{38}$, $R_{39}$ connected in series between the earth rail and one side of a capacitor $C_8$, the other side of which is connected to the output terminal of the amplifier $A_2$. Said one side of the capacitor $C_8$ is also connected to the cathode of a diode $D_5$, The anode of which is connected to the earth rail.

The transistors $N_4$ and $P_4$ turn on for a time dependent on the time constant of the capacitor $C_8$ with the resistor $R_{38}$, $R_{39}$ (typically about 0.7 ms) when the output of the amplifier $A_2$ goes high. At the same time a short duration positive going pulse is passed to the drive circuit 13.

The capacitor $C_8$ and resistors $R_{38}$, $R_{39}$ provide part of a minimum off-time circuit which is associated with the Schmitt bistable circuit 14. The remainder of this minimum off-time circuit is provided by a resistor $R_{40}$ and a diode $D_6$ in series between the collector of the transistor $P_4$ and the non-inverting input terminal of the amplifier $A_2$. These components ensure that, however the input to the Schmitt bistable circuit behaves immediately following the output of amplifier $A_2$ going high, the output of amplifier $A_2$ will not go low again for a preset time, i.e. until transistors $P_4$ and $N_4$ switch off when capacitor $C_8$ is charged up, because of the additional heavy position feedback to the amplifier $A_2$.

The input to the drive circuit 12 is derived from the signal at the collector of the transistor $P_4$ via a monostable delay circuit based on an operational amplifier $A_3$. The collector of the transistor $P_4$ is connected via a capacitor $C_9$ and a resistor $R_{41}$ in series to the inverting input terminal of the amplifier $A_3$. The non-inverting input terminal of this amplifier is connected by a bias resistor $R_{42}$ to the +8v rail and by a positive feedback resistor $R_{43}$ to the output terminal of amplifier $A_3$. A diode $D_7$ has its anode connected to the output terminal of the amplifier $A_3$ and its cathode connected by a resistor $R_{44}$ to the inverting input terminal of the amplifier $A_3$ to provide negative feedback when the output of amplifier $A_3$ is high, a capacitor $C_{10}$ connecting the cathode of the diode $D_7$ to the earth rail.

When transistor $P_4$ turns on the output of the amplifier $A_3$ goes low until capacitor $C_{10}$ has discharged through the resistor $R_{44}$. The output of amplifier $A_3$ then goes high again the capacitor $C_9$ having meanwhile become fully charged and remains high until transistor $P_4$ turns on again. The output terminal of amplifier $A_3$ is connected to the earth rail via a capacitor $C_{11}$ and two resistors $R_{45}$, $R_{46}$ and the input to the drive circuit 12 is taken from the common point of these resistors.

The armature chopper circuit shown in FIG. 4 includes a main thyristor TH1, a commutating thyristor TH2 and a "ring-round" thyristor TH3, which are connected to be triggered by the drive circuits 11, 12 and 13 respectively. The main thyristor TH1 has its cathode connected via a main fuse 50 to an earth conductor and its anode is connected to one end of the armature winding 51 of the motor. The other end of the armature winding 51 is connected via a contact RL3a of the contactor RL3 to a high voltage positive supply conductor, the positive and negative supply conductors being connected by the isolator contacts 48 to the terminals of a high voltage (e.g. 200–300 volts) battery. A power diode $D_8$ has its cathode connected to said other end of the armature winding 51 and its anode connected by an auxiliary fuse 52 to the earth conductor. This diode is operative during braking, when the contact RL3a is open. A further power diode $D_9$ has its anode connected to the anode of the thyristor TH1 and its cathode connected to the supply rail. This further diode is operative to conduct decaying armature current each time the main thyristor TH1 is turned off. A resistor $R_{50}$ and a capacitor $C_{12}$ are connected in series between the anode and cathode of the thyristor TH1.

The commutating thyristor TH2 has its anode connected to the anode of the main thyristor TH1 and its cathode connected by a fuse 53 and an indicator 54 to one side of a commutating capacitor $C_{13}$, the other side of which is connected to the earth conductor. Said one side of the capacitor $C_{13}$ is also connected via a resistor $R_{51}$ and a diode $D_{10}$ in series to the supply rail. The "ring-around" thyristor TH3 has its cathode connected to the earth conductor and its anode connected via an inductor 55 to said one side of the capacitor $C_{13}$.

When thyristor TH1 is fired current flows through the armature 51 and the relay contact RL3a (assuming this to be closed). When the armature current reaches a sufficiently high level for the output of the amplifier $A_2$ (FIG. 3) to be driven high, the thyristor TH3 is fired immediately and the thyristor TH2 is fired after the delay mentioned above. The capacitor $C_{13}$ is positively charged at this time, charge having been maintained if the thyristor TH1 has been conducting for a long period by current trickling into the capacitor $C_{13}$ via the resistor $R_{51}$. When thyristor TH3 fires, the capacitor $C_{13}$ commences discharging through the inductor 55, peak current being reached as the capacitor $C_{13}$ becomes completely discharged. Current continues to flow in the inductor 55, however, charging capacitor $C_{13}$ to a peak reverse voltage at which thyristor TH3 ceases to conduct. The delay set by the delay circuit constituted by the monostable circuit $A_3$ is longer than the time taken by this "ring-around" operation. When thyristor TH2 is fired, however, the armature current is diverted in the now reversed charged capacitor $C_{13}$, allowing thyristor TH1 to turn off. This diverted armature current continues to flow until the capacitor $C_{13}$ again becomes fully charged in the original sense whereupon thyristor TH2 turns off and the continuing armature current (now decaying) flows through the diode $D_9$. When the armature current has fallen low enough to cause the output of amplifier $A_2$ to go low again thyristor TH1 is fired. In this way the armature current is kept between predetermined limits relative to the demanded armature current.

FIG. 4 also shows the current signal generator 16 of FIG. 1, which includes an operational amplifier $A_4$ with it inverting and non-inverting input terminals connected by resistors $R_{52}$ and $R_{53}$ to the output terminals of a Hall plate device 56 energized by two resistors $R_{54}$, $R_{55}$ connecting it to the +8v and earth rails respectively. A resistor $R_{56}$ connects the non-inverting input terminal of amplifier $A_4$ to the earth rail and an npn transistor $N_5$ is connected as an emitter follower to the output terminal of the amplifier $A_4$. A resistor $R_{57}$ and a diode $D_{11}$ in series connect the collector of the transistor $N_5$ to the +8v rail and the emitter of this transistor is connected by two resistors $R_{58}$ and $R_{59}$ in series to the inverting input terminal of the amplifier $A_4$ so that this operates as a difference amplifier. The emitter of the transistor $N_5$ is connected by a temperature compensation network to the ground rail, such network consisting of two resistors $R_{60}$, $R_{61}$ in series and a thermistor $RT_1$ connected across the resistor $R_{60}$. The output to the difference amplifier 15 is taken from the junction of the resistors $R_{60}$, $R_{61}$. To provide a logic output when there is no difference input to the amplifier $A_4$ (i.e. when the armature current is zero), a pnp transistor $P_5$ has its base connected to the collector of the transistor $N_5$, its emitter connected to the +8v rail and its collector connected to the motor/brake logic circuit 44 (see FIG. 2 and FIG. 7b).

Turning now to FIG. 5, the field current control circuit includes the start up circuit 30 based on an npn transistor $N_6$ which has its emitter connected to the ground rail and its base connected to the common point of two resistors $R_{63}$, $R_{64}$ across a capacitor $C_{14}$ connected at one side to the ground rail and at the other side by a resistor $R_{65}$ to the output terminal of the amplifier $A_2$ (FIG. 3). A capacitor $C_{16}$ connects the collector of the transistor $N_6$ to the ground rail such collector being also connected by a resistor $R_{66}$ to the output terminal of the difference amplifier 15 (see FIG. 3). The transistor $N_6$ is normally on, capacitor $C_{15}$ charging up whenever the output of amplifier $A_2$ is high and discharging only slowly when the output of amplifier $A_2$ is low (i.e. when thyristor TH1 is on). Should the output of amplifier $A_2$ remain low for an extended period (indicating that the demanded current cannot be achieved) transistor $N_6$ turns off, permitting its collector to follow the signal at the output of the difference amplifier 15.

The collector of the transistor $N_6$ is connected to the anode of a diode $D_{13}$, the cathode of which is connected by a resistor $R_{70}$ to the inverting input terminal of the difference amplifier 29 (FIG. 1). The non-inverting input terminal of amplifier 29 is connected by a bias resistor $R_{71}$ to the +8v rail and a feedback resistor $R_{72}$ connects the output terminal of the amplifier 29 to its inverting input terminal. The ripple rejection circuit shown in FIG. 1 is constituted by a resistor $R_{173}$ and a capacitor $C_{117}$ in series between the cathode of the diode D1 $D_{13}$ and the non-inverting input terminal of the amplifier 29.

Current can flow into the inverting input terminal of the amplifier 29 via the diode $D_{13}$ whenever the signal at the output terminal of the amplifier 15 is high and the transistor $N_6$ has turned off. These conditions occur only during forward motoring. Alternatively current can flow into the inverting input terminal of the amplifier 29 via a diode $D_{14}$ from the output terminal of an amplifier $A_5$ connected as an inverting amplifier producing an output dependent on the difference between the signal at the output of the amplifier 15 and a reference value (set by a resistor $R_{73}$ connecting the non-inverting input of the amplifier $A_5$ to the +8v rail). The amplifier $A_5$ has its inverting terminal connected by a resistor $R_{174}$ to the terminal A and by a resistor $R_{175}$ to its output terminal. This current flow occurs only during braking. In either event, when the current flowing into the inverting input terminal of amplifier 29 rises above that flowing into the non-inverting input terminal, the output of the amplifier 29 will fall linearly below a normal high value.

The output terminal of the amplifier 29 is connected by two resistors $R_{75}$, $R_{76}$ to the +8v rail. Three further resistors $R_{77}$, $R_{78}$ and $R_{79}$ in series connect the junction of the resistors $R_{75}$, $R_{76}$ to the ground rail. The junction of the resistors $R_{77}$, $R_{78}$ is connected to the cathode of a diode $D_{15}$, the anode of which is connected to the output terminal of an operational amplifier $A_6$. The inverting input of this amplifier $A_6$ is connected to its output terminal by a resistor $R_{80}$ and to the +8v rail by a resistor $R_{81}$. The non-inverting input of the amplifier $A_6$ is connected by a resistor $R_{82}$, to the emitter of the transistor $N_2$, $N_3$ (FIG. 3). Amplifier $A_6$ acts as a non-inverting amplifier of the voltage on the resistor $R_{13}$ (FIG. 3) to boost field current at high armature current demand levels.

The junction of the resistors $R_{78}$, $R_{79}$ is connected by a resistor $R_{83}$ to the base of an npn transistor $N_7$ the emitter of which is connected to the earth rail via a resistor $R_{84}$ and the collector of which is connected to the collector of the transistor $P_2$ (FIG. 3) which is on whenever a demand for motoring or braking is present.

The transistor $N_7$ can be turned off either by the signal at a terminal F (see FIG. 7b) going low or an npn transistor $N_8$ being turned on. Transistor $N_8$ has its emitter connected to the ground rail, its collector connected to the base of the transistor $N_7$ (and to terminal F) and its base connected to the junction of two resistors $R_{85}$ and $R_{86}$ which are in series between a terminal F' (FIG. 7b) and the ground rail. Terminal F' is also connected to the anode of the diode $D_2$ (FIG. 3) so that transistor $N_8$ can turn on only when the signal at the terminal F' is high and transistor $N_1$ (FIG. 3) is off (indicating that neither brake nor accelerator pedal is depressed).

The transistor $N_7$ acts (when transistor $P_2$ is on) as an emitter follower and its emitter is connected by a resistor $R_{87}$ to the non-inverting input terminal of the field current difference amplifier 27, which terminal is also connected to the +8v rail by a resistor $R_{88}$. A resistor $R_{89}$ connects the inverting input terminal of amplifier 27 to the +8v rail and another resistor $R_{90}$ connects this terminal to the output of the field current signal generator 29 which is similar to the armature current signal generator 16 (shown in detail in FIG. 4). Feedback around the amplifier 27 is provided by a resistor $R_{91}$ and a capacitor $C_{17}$ in parallel with each other between the output and inverting input terminals of the amplifier 27.

The Schmitt trigger bistable circuit 25 of FIG. 1, is constituted by an operational amplifier $A_7$ with a resistor $R_{92}$ connecting the output terminal of amplifier 27 to the inverting input of amplifier $A_7$. The non-inverting input of amplifier $A_7$ is connected by a resistor $R_{93}$ to the +8v rail and by two resistors $R_{94}$, $R_{95}$ in series to the output terminal of amplifier $A_7$, a capacitor $C_{18}$ being connected across the resistor $R_{95}$.

The output of amplifier 27 rises and falls linearly with the error between the demanded field current and the actual field current. In steady state conditions $R_{94}$, $R_{95}$ provide a small positive feedback current which establishes hysteresis in the operation of amplifier $A_7$ so that the output of amplifier $A_7$ goes low when the output of amplifier 27 rises above one set level and goes high when the output amplifier 27 falls below a lower set level. The capacitor $C_{18}$ introduces additional positive feedback for a short period immediately following each change in level of the output of amplifier $A_7$, thereby inhibiting a further change in level for this period, irrespective of how the output of amplifier 27 behaves.

The output terminal of amplifier $A_7$ is connected by a resistor $R_{96}$ to the base of an npn transistor $N_8$ which has its emitter connected to the earth rail and its collector connected by a resistor $R_{97}$ to the +8v rail. A further npn transistor $N_9$ has its base connected to the collector of the transistor $N_8$, its emitter connected to the earth rail and its collector connected by a resistor $R_{98}$ and the light-emitting diode of the opto-isolator 26.

Figure 6:
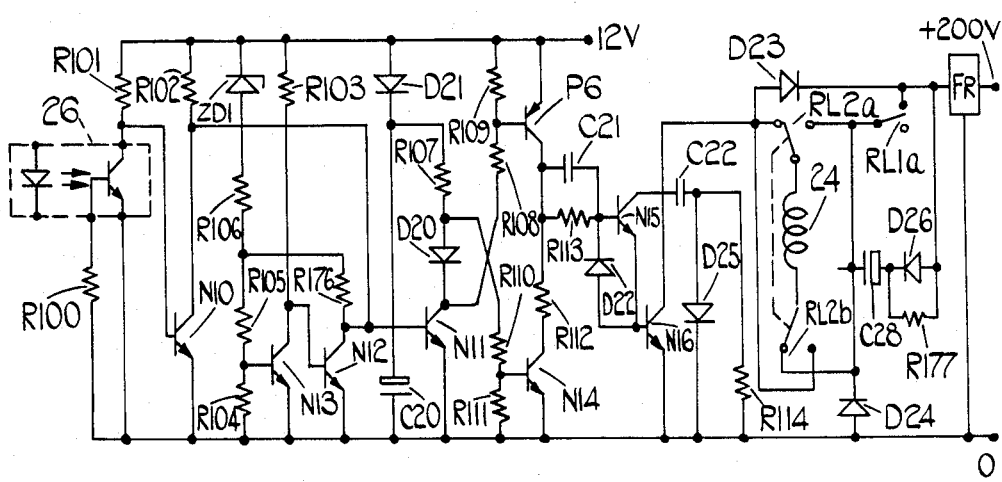
FIG. 6 is an electrical circuit diagram of a field chopper circuit forming part of FIG. 1, and FIGS. 7a, 7b and 7c together make up the electrical circuit diagram of the logic circuit of FIG. 2.

Turning now to FIG. 6 it will be seen that the photo-transistor of the opto-isolator 26 has its base connected by a resistor $R_{100}$ to the earth rail and its emitter connected directly to the same rail. The collector of the photo-transistor is connected by a resistor $R_{101}$ to a +12v rail connected to a tapping on the traction battery and is also connected to the base of an npn transistor $N_{10}$ which has its emitter connected to the negative supply rail and its collector connected by a resistor $R_{102}$ to the +12v rail. The collector of the transistor $N_{10}$ is connected to the base of an npn transistor $N_{11}$ the emitter of which is connected to the earth rail. An npn transistor $N_{12}$ has its collector connected to the base of the transistor $N_{11}$ and its emitter connected to the earth rail. The base of the transistor $N_{12}$ is connected to the collector of an npn transistor $N_{13}$ which has it emitter connected to the earth rail and its collector connected by a resistor $R_{103}$ to the +12v rail. The base of the transistor $N_{13}$ is connected by a resistor $R_{104}$ to the earth rail and by two resistors $R_{105}$, $R_{106}$ to the anode of a zener diode $ZD_1$, the cathode of which is connected to the +12v rail. The collector of the transistor $N_{12}$ by a resistor $R_{176}$ is connected to the junction of the resistors $R_{105}$ and $R_{106}$.

The collector of the transistor $N_{11}$ is connected to the cathode of a diode $D_{20}$, the anode of which is connected by a resistor $R_{107}$ to the cathode of a diode $D_{21}$, the anode of which is connected to the +12v rail. The cathode of the diode $D_{21}$ is connected by a capacitor $C_{20}$ to the earth rail. The cathode of the diode $D_{20}$ is connected by two resistors $R_{108}$, $R_{109}$ in series to the +12v rail. The anode of the diode $D_{20}$ is connected by two resistors $R_{110}$ and $R_{111}$ in series to the earth rail. An npn transistor $N_{14}$ has its base connected to the junction of the resistors $R_{110}$ and $R_{111}$ and a pnp transistor $P_6$ has its base connected to the junction of the resistors $R_{108}$ and $R_{109}$. The transistors $N_{14}$ and $P_6$ have their emitters connected respectively to the negative supply rail and the +12v and their collectors interconnected by a resistor $R_{112}$.

The collector of the transistor $P_6$ is connected by a resistor $R_{113}$ and a capacitor $C_{21}$ in parallel to the base of an npn transistor $N_{15}$ the emitter of which is connected to the base of an npn transistor $N_{16}$ the emitter of which is connected to the negative supply rail. The collectors of the transistors $N_{15}$ and $N_{16}$ are connected together and a diode $D_{22}$ has its cathode connected to the base of the transistor $N_{15}$ and its anode connected to the base of the transistor $N_{16}$. The collectors of the transistors $N_{15}$, $N_{16}$ are connected to the normally closed contact of a changeover contact set RL2a of the relay RL2 and also to the normally open contact of a change-over contact set RL2b of the relay RL2. The other contacts of these two contact sets are connected together and via a normally closed contact RL1a of relay RL1 to a high voltage supply via a filter $F_R$. The field winding 24 is connected between the common terminals of the contact sets RL2a, RL2b. The collectors of transistors $N_{15}$, $N_{16}$ are also connected by a diode $D_{23}$ to the output of the filter $F_R$, a further diode $D_{24}$ connecting the said other contacts of the contact sets RL2a, RL2b to the negative supply rail. In addition, a capacitor $C_{22}$ connects the collectors of the transistors $N_{15}$, $N_{16}$ to the anode of a diode $D_{25}$ the cathode of which is connected to the negative supply rail. A resistor $R_{114}$ is in parallel with the diode $D_{25}$. A resistor $R_{177}$ in series with a capacitor $C_{23}$ connects the cathode of diode $D_{23}$ to the cathode of diode $D_{24}$, a diode $D_{26}$ bridging the resistor $R_{177}$.

Figure 7A:
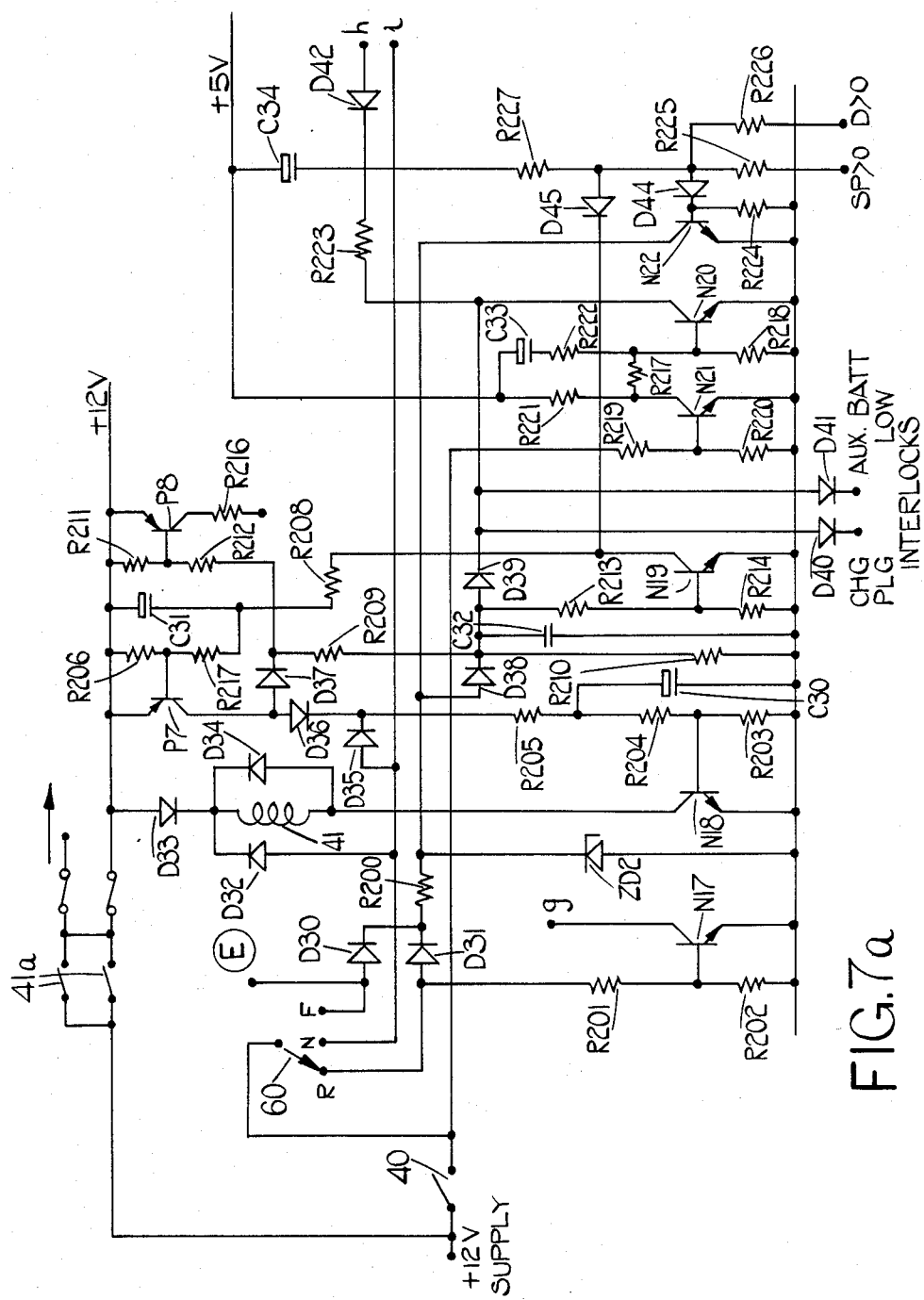

Referring now to FIG. 7a, the +12v supply is connected to one side of an ignition switch 40. The other side of the switch 40 is connected to the common pole of a three way direction selector switch 60 having reverse, neutral and forward contacts. The reverse and forward contacts are connected to the anode of two diodes $D_{30}$, $D_{31}$ which have their cathodes connected together and, via a resistor $R_{200}$ to the cathode of a zener diode $ZD_2$ the anode of which is connected to the earth rail. A pair of resistors $R_{201}$ and $R_{202}$ connect the reverse contact of the selector switch 60 to the earth rail, the junction of these resistors being connected to the base of a npn transistor $N_{17}$ which has its emitter connected to the earth rail and its collector connected to a terminal marked g (see FIG. 7b). The neutral contact is connected to the anode of a diode $D_{32}$ the cathode of which is connected via the power relay winding 40 to the collector of an npn transistor $N_{18}$.

The relay 41 has normally open contacts 41a which control the supply of power to all the control circuits. For energising the relay 40 there is a further diode $D_{33}$ which has its anode connected to the +12v supply rail controlled by the contacts 41a and its cathode connected to the cathode of the diode $D_{32}$. A freewheel diode $D_{34}$ is connected across the relay winding 41.

The base of the transistor $N_{18}$ is connected by a resistor $R_{203}$ to the earth rail and by two resistors $R_{204}$, $R_{205}$ in series to the cathodes of two diodes $D_{35}$ and $D_{36}$. The anode of the diode $D_{35}$ is connected to the neutral contact of switch 60, and the anode of the diode $D_{36}$ is connected to the collector of a pnp transistor $P_7$. The emitter of the transistor $P_7$ is connected to the +12v and its base is connected to this same rail by a resistor $R_{206}$ and by two resistors $R_{207}$, $R_{208}$ in series to the collector of an npn transistor $N_{19}$. A capacitor $C_{30}$ connects the common point of resistors $R_{204}$ and $R_{205}$ to the earth rail and a capacitor $C_{31}$ connects the junction of the resistors $R_{207}$ and $R_{208}$ to the +12v rail.

A diode $D_{37}$ has its anode connected to the collector of the transistor $P_7$ and its cathode connected by two resistors $R_{209}$, $R_{210}$ in series to the earth rail and by two resistors $R_{211}$, $R_{212}$ in series to the +12v rail. A capacitor $C_{32}$ is connected between the earth rail and the common point of the resistors $R_{209}$, $R_{210}$ which point is also connected to the cathode of a diode $D_{38}$ the anode of which is connected to the cathode of the zener diode $ZD_2$. Two resistors $R_{213}$ and $R_{214}$ are connected in series across the capacitor $C_{32}$ and their junction is connected to the base of the transistor $N_{19}$. A pnp transistor $P_8$ has its base connected to the common point of the two resistors $R_{211}$, $R_{212}$, the emitter of the transistor $P_8$ being connected to the +12v rail and its collector being connected via a resistor $R_{216}$ to a terminal f (see FIG. 7b).

A further diode $D_{39}$ has its anode connected to the common point of the resistors $R_{209}$, $R_{210}$ and its cathode connected to the collector of an npn transistor $N_{20}$ and also connected to the anodes of two diodes $D_{40}$ and $D_{41}$ the cathodes of which are connected to two interlock functions, one being a switch contact in a charger plug and the other being a contact which is normally held open when the battery voltage is not too low for satisfactory operation. The emitter of the transistor $N_{20}$ is connected to the earth rail and its base is connected to the common point of two resistors $R_{217}$, $R_{218}$ in series between the collector of an npn transistor $N_{21}$ and the earth rail. The emitter of the transistor $N_{21}$ is connected to the earth rail and its base is connected to the common point of two resistors $R_{219}$ and $R_{220}$ in series between the switch 40 and the earth rail. The collector of the transistor $N_{21}$ is connected by a resistor $R_{221}$ to the +5v supply rail. A resistor $R_{222}$ and a capacitor $C_{33}$ are connected in series between the base of the transistor $N_{20}$ and the +5v rail. The collector of the transistor $N_{20}$ is connected by a resistor $R_{223}$ to the cathode of a diode $D_{42}$ the anode of which is connected to a terminal h (see FIG. 7b).

An npn transistor $N_{22}$ has its emitter connected to the earth rail and its collector connected to the cathode of the zener diode $ZD_2$. The base of the transistor $N_{22}$ is connected by a resistor $R_{224}$ to the earth rail and is also connected to the cathode of a diode $D_{44}$. The anode of the diode $D_{44}$ is connected by two resistors $R_{225}$ and $R_{226}$ to two terminals marked SP>0 (see FIG. 7c) and D>0 (see FIG. 3). A resistor $R_{227}$ and a capacitor $C_{34}$ in series connect the anode of the diode $D_{44}$ to the +5v rail. A diode $D_{45}$ has its anode connected to the anode of the diode $D_{44}$ and its cathode connected to the collector of the transistor $N_{19}$.

Figure 7B:
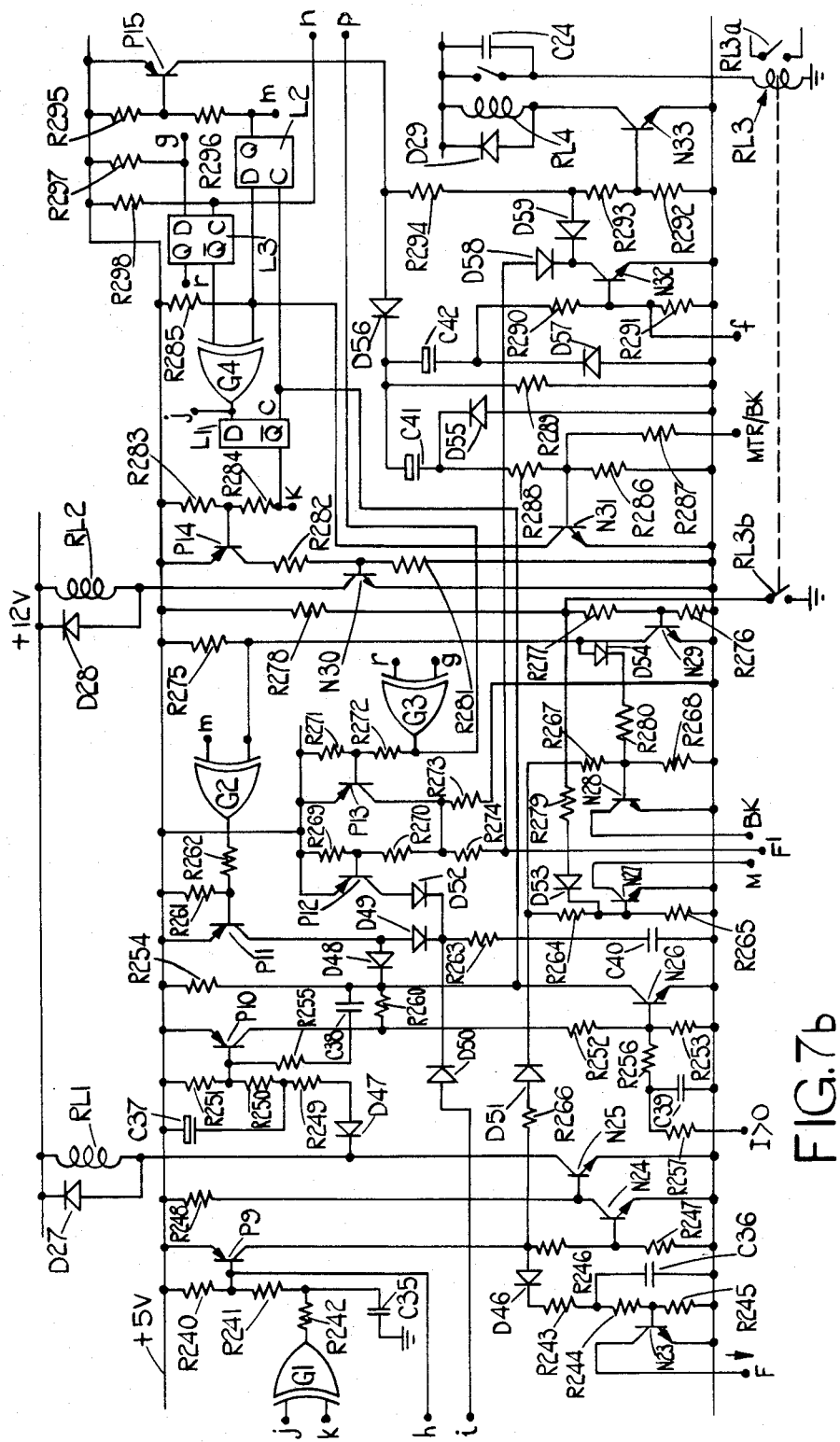

Turning now to FIG. 7b, the terminal h is connected to the base of a pnp transistor $P_9$ which has its emitter connected to the +5v rail. The base of the transistor $P_9$ is connected by a resistor $R_{240}$ to the +5v rail and by two resistors $R_{241}$ and $R_{242}$ in series to the output terminal of an exclusive OR gate G1 (¼ of a TTL integrated circuit type 7486). The junction of resistors $R_{241}$, $R_{242}$ is connected by a capacitor $C_{35}$ to the earth rail. The anode of a diode $D_{46}$ is connected to the collector of the transistor $P_9$ and its cathode is connected by three resistors $R_{243}$, $R_{244}$ and $R_{245}$ in series to the rail, a capacitor $C_{36}$ being connected between the junction of resistors $R_{243}$, $R_{244}$ and the earth rail. The junction of the resistors $R_{244}$, $R_{245}$ is connected to the base of an npn transistor $N_{23}$ which has its emitter connected to the earth rail and its collector connected to the terminal F (See FIG. 5).

The collector of the transistor $P_9$ is connected by two resistors $R_{246}$, $R_{247}$ in series to the earth rail, the common point of these resistors being connected to the base of a transistor $N_{24}$, which has its emitter connected to the earth rail and its collector connected by a resistor $R_{248}$ to the +5v rail. An npn transistor $N_{25}$ has its base connected to the collector of the transistor $N_{24}$, its emitter connected to the earth rail and its collector connected by the winding of the relay RL1 to the +12v rail, a freewheel diode $D_{27}$ being connected across this winding.

The collector of the transistor $N_{25}$ is also connected to the cathode of a diode $D_{47}$, the anode of which is connected by three resistors $R_{249}$, $R_{250}$ and $R_{251}$ in series to the +5v rail. A capacitor $C_{37}$ is connected between the common point of resistors $R_{249}$, $R_{250}$ and the +5v rail and the base of a pnp transistor $P_{10}$ is connected to the common point of the resistors $R_{250}$ and $R_{251}$. The emitter of the transistor $P_{10}$ is connected to the +5v rail and its collector is connected by two resistors $R_{252}$, $R_{253}$ in series to the earth rail. The base of an npn transistor $N_{26}$ is connected to the common point of the resistors $R_{252}$, $R_{253}$ and its emitter is connected to the earth rail. The collector of the transistor $N_{26}$ is connected by a resistor $R_{254}$ to the +5v rail and also by a capacitor $C_{38}$ and a resistor $R_{255}$ in series to the base of the transistor $P_{10}$. The base of the transistor $N_{26}$ is connected by two resistors $R_{256}$ and $R_{257}$ in series to the terminal marked I>0 (see FIG. 4) and a capacitor $C_{39}$ is connected between the junction of these resistors and the earth rail.

The collector of the transistor $P_{10}$ is connected by a resistor $R_{260}$ to the cathode of a diode $D_{48}$, the anode of which is connected to the collector of a pnp transistor $P_{11}$ which has its emitter connected to the +5v rail. A resistor $R_{261}$ connects the base of the transistor $P_{11}$ to the +5v rail and a resistor $R_{262}$ connects the same base to the output terminal of another exclusive OR gate G2. The anode of the diode $D_{48}$ is also connected to the anode of a diode $D_{49}$, the cathode of which is connected by three resistors $R_{263}$, $R_{264}$ and $R_{265}$ in series to the earth rail. A capacitor $C_{40}$ is connected between the earth rail and the junction of the resistors $R_{263}$ and $R_{264}$. A diode $D_{50}$ has its cathode connected to the cathode of the diode $D_{49}$ and its anode connected to the N terminal of the switch 60 (FIG. 7a). A further diode $D_{51}$ has its cathode connected to the junction of the resistors $R_{263}$ and $R_{264}$ and its anode connected via a resistor $R_{266}$ to the anode of the diode $D_{46}$. The junction of the resistors $R_{264}$ and $R_{265}$ is connected to the base of an npn transistor $N_{27}$ which has its emitter connected to the earth rail and its collector connected to the terminal M (see FIG. 3). A pair of resistors $R_{267}$ and $R_{268}$ are connected in series between the earth rail and the junction of the resistor $R_{263}$ and $R_{264}$. An npn transistor $N_{28}$ has its base connected to the junction of these resistors $R_{267}$ and $R_{268}$, its emitter connected to the earth rail and its collector connected to the terminal BK (see FIG. 3).

Also connected to the cathode of the diode $D_{49}$ is the cathode of a diode $D_{52}$, the anode of which is connected to the collector of a pnp transistor $P_{12}$. The emitter of the transister $P_{12}$ is connected to the +5v rail and its base is connected by a resistor $R_{269}$ to the +5v and by resistor $R_{270}$ to the collector of a pnp transistor $P_{13}$. The emitter of the transistor $P_{13}$ is connected to the +5v rail and its base is connected by a resistor $R_{271}$ to the +5v rail and by a resistor $R_{272}$ to the output terminal of a further exclusive OR gate G3. The collector of the transistor $P_{13}$ is connected by a resistor $R_{273}$ to the earth rail and also by a resistor $R_{274}$ to the terminal F' (see FIG. 5).

An npn transistor $N_{29}$ has its emitter connected to the earth rail and its collector connected by a resistor $R_{275}$ to the +5v rail and also connected to one input terminal of the gate G2. The base of the transistor $N_{29}$ is connected by a resistor $R_{276}$ to the earth rail and by two resistors $R_{277}$ and $R_{278}$ in series to the +5v rail. The junction of the resistors $R_{277}$ and $R_{278}$ is connected by a contact RL3b, of the contactor RL3 to the earth rail and also via a resistor $R_{279}$ to the anode of a diode $D_{53}$ whose cathode is connected to the base of the transistor $N_{27}$. The collector of the transistor $N_{29}$ is connected to the anode of a diode $D_{54}$ the cathode of which is connected by a resistor $R_{280}$ to the base of the transistor $N_{28}$.

The relay winding RL2 is connected between the +12v rail and the collector of an npn transistor $N_{30}$, the emitter of which is connected to the earth rail, a diode $D_{28}$ being connected across this winding. The base of the transistor $N_{30}$ is connected by a resistor $R_{281}$ to the earth rail and by a resistor $R_{282}$ to the collector of a pnp transistor $P_{14}$, the emitter of which is connected to +5v rail. The base of the transistor $P_{14}$ is connected by a resistor $R_{283}$ to the +5v rail and by a resistor $R_{284}$ to the $\overline{Q}$ output terminal of a bistable latch circuit $L_1$ (which may be ¼ of a TTL integrated circuit type 7475). The DATA input of the latch $L_1$ is connected to the output terminal of another exclusive OR gate G4, and its CLOCK input terminal is connected to the collector of the transistor $N_{26}$. The DATA input terminal of the latch $L_1$ and its $\overline{Q}$ output terminal are connected to the two input terminals of the gate G1.

The gate G4 has one input terminal connected by a resistor $R_{285}$ to the +5v rail and also connected to the collector of an npn transistor $N_{31}$, the emitter of which is connected to the earth rail. The base of the transistor $N_{31}$ is connected by a resistor $R_{286}$ to the earth rail, by a resistor $R_{287}$ to the terminal MTR/BK (see FIG. 3) and by a resistor $R_{288}$ to the cathode of a diode $D_{55}$, the anode of which is connected to the earth rail. The cathode of the diode $D_{55}$ is also connected by a capacitor $C_{41}$ to the cathode of a diode $D_{56}$, which cathode is connected to the ground rail by a resistor $R_{289}$. A capacitor $C_{42}$ connects the cathode of the diode $D_{56}$ to the cathode of a diode $D_{57}$ which is also connected to the earth rail by two resistors $R_{290}$, and $R_{291}$ in series, the anode of the diode $D_{57}$ being connected to the earth rail. An npn transistor $N_{32}$ has its base connected to the junction of the resistors $R_{290}$, $R_{291}$ and also to the resistor $R_{216}$ (see FIG. 7a) via terminal f. The emitter of the transistor $N_{32}$ is connected to the ground rail and its collector is connected to the cathodes of two diodes $D_{58}$ and $D_{59}$, the anode of the diode $D_{58}$ being connected to the terminal F' and the anode of the diode $D_{59}$ being connected via two resistors $R_{292}$, $R_{293}$ in series to the earth rail. The anode of the diode $D_{59}$ is also connected by a resistor $R_{294}$ to the anode of the diode $D_{56}$, which is also connected to the collector of a pnp transistor $P_{15}$. The emitter of the transistor $P_{15}$ is connected to the +5v rail, and its base is connected to this rail by a resistor $R_{295}$. A resistor $R_{296}$ connects the base of the transistor $P_{15}$ to the Q output terminal of a bistable latch circuit $L_2$ which has its CLOCK input connected to the collector of the transistor $N_{26}$ and its DATA input connected to the collector of the transistor $N_{31}$. The Q output terminal of the latch $L_2$ is also connected to an input terminal of the gate G2, via terminal m.

The other input terminal of the gate G4 is connected to the $\overline{Q}$ output terminal of a third bistable latch circuit $L_3$ which has its DATA input terminal connected by a resistor $R_{297}$ to the +5v rail and also connected to the collector of the transistor $N_{17}$ (see FIG. 7a). The CLOCK input terminal of the latch $L_3$ is connected by a resistor $R_{298}$ to the +5v rail and is also connected to a terminal n (see FIG. 7c).

The junction of the resistors $R_{292}$ and $R_{293}$ is connected to the base of an npn transistor $N_{33}$ which has its emitter connected to the earth rail and its collector connected by a relay winding RL4 to the +12v rail, the relay RL4 having a normally open contact controlling the contact RL3. The relay winding RL4 is bridged by a freewheel diode $D_{29}$ and a capacitor $C_{24}$ bridging its normally open contact.

Figure 7C:
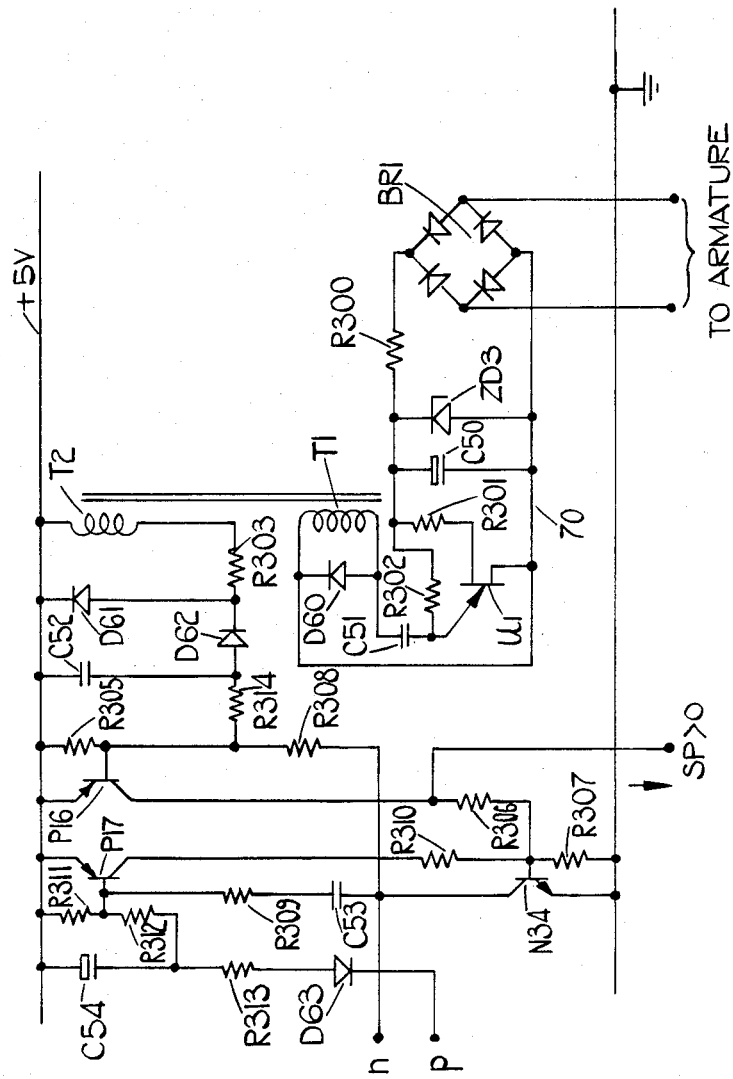

Turning finally to FIG. 7c, a bridge rectifier BR1 has its input terminals connected to opposite ends of the motor armature winding. The negative output terminal of the bridge rectifier is connected by a rail 70 to one end of a transformer primary $T_1$. The positive output terminal of the bridge rectifier is connected by a resistor $R_{300}$ to the cathode of a zener diode $ZD_3$, the anode of which is connected to the rail 70. A capacitor $C_{50}$ is connected across the zener diode $ZD_3$. The unijunction transistor $U_1$, has its base 1 connected to the rail 70, its base 2 connected by a resistor $R_{301}$ to the cathode of the zener diode $ZD_3$ and its emitter connected by a resistor $R_{302}$ to the cathode of the zener diode $ZD_3$. A capacitor $C_{51}$ is connected between the emitter of the unijunction transistor $U_1$ and the other end of the primary winding $T_1$, a diode $D_{60}$ being connected across the winding $T_1$.

The secondary winding $T_2$ of the transformer is connected at one end to the +5v rail. Its other end is connected by a resistor $R_{303}$ to the anode of a diode $D_{61}$ and the cathode of a diode $D_{62}$, the cathode of the diode $D_{61}$ being connected to the +5v rail. The anode of the diode $D_{62}$ is connected by a capacitor $C_{52}$ to the +5v rail and by a resistor $R_{304}$ to the base of a pnp transistor $P_{16}$. A resistor $R_{305}$ connects the base of the transistor $P_{16}$ to the +5 l v rail and the emitter of this transistor is connected to the same rail. The collector of the transistor $P_{16}$ is connected to the terminal marked SP>O and is also connected by a resistor $R_{306}$ to the base of an npn transistor $N_{34}$, the emitter of which is connected to the earth rail. A resistor $R_{307}$ connects the base of the transistor $N_{34}$ to the earth rail and the collector of the transistor $N_{34}$ is connected by a resistor $R_{308}$ to the base of the transistor $P_{16}$ to provide latching action. The collector of the transistor $N_{34}$ is connected to the terminal n and is also connected by a capacitor $C_{53}$ and a resistor $R_{309}$ in series to the base of a pnp transistor $P_{17}$. The emitter of the transistor $P_{17}$ is connected to the +5 v rail and its collector is connected by a resistor $R_{310}$ to the base of the transistor $N_{34}$. The base of the transistor $P_{17}$ is connected by a resistor $R_{311}$ to the +5 v rail and by two resistors $R_{312}$, $R_{313}$ in series to the anode of a diode $D_{63}$, the cathode of which is connected (via a terminal p) to the output terminal of the gate G3. A capacitor $C_{54}$ connects the junction between the resistors $R_{312}$, $R_{313}$ to the earth rail.

Having, thus, described the various components shown in FIGS. 7a to 7c and the connections between them, the operation of the logic circuits will now be explained in detail.

At start up, when the ignition switch 40 is closed and the switch 60 is in neutral position the transistor $N_{18}$ can turn on, being supplied with base current through the diode $D_{35}$ and the resistors $R_{204}$ and $R_{205}$. Current can then flow through the diode $D_{32}$ and the relay coil 41. The contacts of this replay provide power to the circuits and also relay latching current via the diode $D_{33}$. Initially, the transistor $P_8$ is turned on via resistors $R_{212}$, $R_{209}$, $R_{210}$ so that its collector is high. The capacitor $C_{40}$ charges up via the diode $D_{50}$ and the resistor $R_{263}$ from the neutral contact of the switch 60. Capacitor $C_{40}$ holds on both transistors $N_{27}$, and $N_{28}$ which act to clamp the motoring and braking demand signals to zero.

When the switch 60 is moved to, say, the forward position, the transistor $N_{19}$ receives base current via diodes $D_{30}$ and $D_{38}$ and resistors $R_{200}$ and $R_{213}$. Transistor $N_{19}$ conducts and causes transistor $P_7$ to turn on via the resistors $R_{208}$ and $R_{217}$. This is a latching arrangement and transistor $N_{19}$ is held on via diode $D_{37}$, and resistors $R_{209}$ and $R_{213}$. The transistor $P_7$ also keeps the transistor $N_{18}$ on via the diode $D_{36}$ and the resistors $R_{204}$ and $R_{205}$, so that the relay 41 remains energised. The transistor $P_8$, however, loses its supply of base current because the transistor $P_7$ collector has gone high and $P_8$ therefore turns off, the function of which will be explained hereinafter. Also transistors $N_{27}$ and $N_{28}$ turn off after a delay whilst the capacitor $C_{40}$ discharges, since base current via the neutral switch position has been lost, so that an armature current demand can now be made.

There are certain restrictions and conditions governing the selection of forward and reverse drive for safety reasons. Firstly, the transistor $N_{21}$ is turned on by a +12 v supply from the vehicle "ignition" switch 40 through the resistor $R_{219}$. This keeps the junction of the resistors $R_{217}$ and $R_{221}$ normally low (and transistor $N_{20}$ therefore off) except when first powering up the circuit when the +5 v supply rises rapidly and transistor $N_{20}$ is turned on via the capacitor $C_{33}$ and resistor $R_{222}$ whilst capacitor $C_{33}$ is charging up. Transistor $N_{20}$ turns on the transistor $P_9$ through the resistor $R_{223}$ and the diode $D_{42}$ during this period (approximately 25 mS) for reasons explained hereinafter. At the same time another capacitor/resistor combination $C_{34}$ and $R_{227}$ hold the transistor $N_{22}$ on for about 150 mS. Transistor $N_{22}$ prevents transistor $N_{19}$ from turning on during this time because of the connection of the collector of transistor $N_{22}$ to the junction of resistor $R_{200}$ and diode $D_{38}$. These delays ensure correct starting up of the circuit when switching on and immediately selecting forward or reverse drive. There are also four interlock signals which prevent forward or reverse being selected, these being the charger plug interlock and auxiliary battery low cut-out which when low (Ov) hold the cathode of diode $D_{39}$ low via diode $D_{40}$ or $D_{41}$ and prevent transistor $N_{19}$ from turning on. The other two interlocks are provided by the D>O and SP>O signals, which, when high, turn transistor $N_{22}$ on and also prevent transistor $N_{19}$ turning on, so that if transistor $N_{19}$ is on these two signals can have no effect because transistor $N_{22}$ is held off by the diode $D_{45}$ and the transistor $N_{19}$.

When the "ignition" switch 40 is opened transistor $N_{21}$ loses its base drive and turns off, so that transistor $N_{20}$ turns on and removes the base current from the transistor $N_{19}$ via diode $D_{39}$. After a delay of about 200 mS, while capacitor $C_{31}$ discharges, the transistor $P_7$ turns off and transistor $P_8$ turns on. This makes the collector of transistor $P_8$ go high which is used, as explained hereinafter to make the contactor RL3 open. The transistor $P_9$ has previously turned on and clamped all the demand signals by turning on transistors $N_{23}$, $N_{27}$ and $N_{28}$ so that no current will be flowing in the armature and field windings. After a further delay of about 150 mS whilst capacitor $C_{30}$ is discharging the transistor $N_{18}$ turns off causing the relay 41 to drop out and remove power from the entire circuit. The vehicle can also be shut down by taking either of the interlock diodes $D_{40}$, $D_{41}$, to Ov, the same sequence than taking place.

When the vehicle is actually being driven forward (or is in the forward drive connection made and at rest) and reverse drive is required, switch 60 is operated to select reverse drive. In this reverse position base current for the transistor $N_{17}$ is provided by resistor $R_{201}$ and transistor $N_{17}$ therefore holds the DATA input of the latch L3 low. The latches can only change state when the signals at their CLOCK inputs are high and in the case of the latch L3, this can only occur if the vehicle is not moving, movement being detected by sensing the voltage across the motor armature with a small field current flowing. If a voltage is present the motor must be rotating, the bridge rectifier BR1 detecting such voltage (the polarity of which will depend on whether motoring or braking mode is in operation). The output of the bridge rectifier BR1 is dropped by the resistor $R_{300}$ and the zener diode $ZD_3$ to +15 v. Capacitor $C_{50}$ provides smoothing during chopping when the armature voltage varies. The voltage across the capacitor $C_{50}$ drives an oscillator based on the unijunction transistor $U_1$, and the pulses generated by the oscillator are transferred to the remainder of the circuit through the pulse transformer $T_1$, $T_2$. The diodes $D_{61}$, $D_{62}$, the resistor $R_{303}$ and the capacitor $C_{52}$ form a diode pump circuit which acts to turn on the transistor $P_{16}$ via resistor $R_{304}$. The transistor $P_{16}$ turns on transistor $N_{34}$ and also holds the CLOCK input of the latch L3 low to prevent change over of the latch.

When a change from forward to reverse is demanded the following sequence occurs:- The demanded change is detected and a small field current is applied to the motor. After a delay, if no armature voltage has been detected, the change over is allowed. Normally the output of gate G3 is low because both of its inputs are the same. Transistor $P_{13}$ is on as is transistor $P_{17}$ (via diode $D_{63}$ and resistors $R_{312}$, $R_{313}$) so that transistor $N_{34}$ is on preventing the change over of latch L3. When the direction change is demanded the DATA input to latch $L_3$ goes high, so that one input of gate G3 also goes high as does the output of gate G3. Transistor $P_{13}$ turns off and transistor $P_{12}$ turns on thereby clamping the armature demand via transistors $N_{27}$ and $N_{28}$. Transistor $P_{13}$ turning off removes the supply of the base of transistor $N_8$ (FIG. 5) via resistors $R_{274}$ and $R_{85}$ (FIG. 5). This releases the base of transistor $N_7$ (FIG. 5) so that a minimum field current demand is applied to the field chopper. A back emf is therefore generated if the motor is rotating. During this time the diode $D_{63}$ has become reverse biased and capacitor $C_{54}$ discharges through the resistor $R_{312}$ into the base of transistor $P_{17}$ and after a delay of about 100 mS transistor $P_{17}$ turns off and transistor $N_{34}$ also turns off, provided that transistor $P_{16}$ is not on. Turning off of transistors $P_{17}$ and $N_{34}$ is speeded up by the capacitor $C_{53}$ and resistor $R_{309}$ providing positive feedback, thereby ensuring a fast edge to the signal at the CLOCK input of the latch $L_3$ which is desirable for interference-free operation. The latch $L_3$ can now change to the required state and its $\overline{Q}$ output is compared by gate G4 with the motor/brake demand signal from the collector of the transistor $N_{31}$. The output of the gate G4 goes to latch $L_1$ whose $\overline{Q}$ output drives the field reversing relay RL2 via resistor $R_{284}$ transistor $P_{14}$, resistor $R_{282}$ and transistor $N_{30}$. This circuit arrangement gives the required field current directions for forward and reverse, motoring and braking as shown, in the following table:-

| Operating mode | L3 DATA | $\overline{L3Q}$ | G4 in | G4 out | $\overline{L1Q}$ | Field Direction | Relay RL2 |
|---|---|---|---|---|---|---|---|
| Forward Motoring | High | Low | Low | Low | High | Normal | Off |
| Forward Braking | High | Low | High | High | Low | Reverse | On |
| Reverse Motoring | Low | High | Low | High | Low | Reverse | On |
| Reverse Braking | Low | High | High | Low | High | Normal | Off |

The relay RL1 is arranged to be operated for a sufficient time when a changeover is demanded to ensure reduction of the field current to zero. Thus the reversing relay RL2 is never required to break any current which could damage its contacts. The change-over sequence is as follows:-

The $\overline{Q}$ output of latch $L_3$ changes as described above and the change passes through the gate G4 to the latch $L_1$ DATA input. However, latch $L_1$ cannot change immediately because transistor $N_{26}$ is held on by transistor $P_{10}$, and transistor $N_{25}$. The demanded change is detected by gate $G_1$ whose output goes low and turns on transistor $P_9$ which turns on transistor $N_{24}$. The demand clamping transistors $N_{23}$, $N_{27}$ and $N_{28}$ are also turned on by the gate G1 output, thereby ensuring that there are no field or armature current demands. The transistor $N_{24}$ clamps the base of transistor $N_{25}$ to 0v and therefore de-energises the relay RL1 so that its contacts open and the field current decays rapidly to zero. After a delay somewhat longer than that required to reduce the field current to zero (about 75 mS), the capacitor C37 discharges and transistor $P_{10}$ turns off. Thus transistor $N_{26}$ loses its base current from resistors $R_{252}$ and also turns off, so that the latch $L_1$ CLOCK input goes high and latch $L_1$ can change to its new state. Gate G1 then changes back to its normal high output state, the relay RL1 is re-energised and the clamping transistors are turned off after short delays produced by capacitor $C_{36}$ with resistor $R_{244}$ and capacitor $C_{40}$ with resistors $R_{264}$ and $R_{267}$ to allow the relays to attain their correct conditions. The vehicle is then drivable in the required direction. The same sequence of events occurs in the opposite direction of change over, except that the latches and gates end up in the required state as shown in the table above.

Field forcing also occurs on switch on by the turning on of the transistor $P_9$ via transistor $N_{20}$ to ensure that no field or armature current demand is made before the relays have settled in their normal operating positions. At shut down a similar sequence occurs when the ignition switch is opened or one of the interlock diodes $D_{40}$, $D_{41}$ is taken low.

The change over from motoring to braking is very similar to the forward-reverse change over. In motoring the MTR/BK selector (i.e. the output of amplifier $A_1$ FIG. 3) is high so that transistor $N_{31}$ is on and the Q output of latch $L_2$ is low. When the MTR/BK signal goes low, the DATA input of latch $L_2$ and one input of gate G4 change state, latch $L_1$ therefore changes when transistor $N_{26}$ turns off as described above, also latch 12 changes at the same time. Thus transistors $P_{15}$ and $N_{33}$ turn off, gate G2 detects the change (because of the delay in contactor RL3 operation). Transistor $N_{29}$ turns off and causes $N_{27}$ to turn on via resistors $R_{278}$, $R_{279}$ and diode $D_{53}$ (in braking) or transistor $N_{28}$ to turn on via resistor $R_{275}$ and $R_{280}$ and diode $D_{54}$ in motoring. This ensures that the braking demand is clamped in motoring and vice versa. While the Q output signal of latch $L_1$ and the the output of the gate G2 is low and the transistor P holds the transistors $N_{27}$ and $N_{28}$ on. These damand clamps are released after the contactor RL3 has reached its new position, that is transistor $P_{15}$ has turned off and removed drive to transistor $N_{33}$ and the relay RL4, so that the brake contact RL3 is in its de-energised state which is the normally open (braking) position. There are two further safety interlocks to protect the contactor:- namely on I>O signal from the current transducer to transistor $N_{26}$ to prevent the latch changing if an armature current is flowing and transistor $P_{11}$ conducts during change over to hold transistor $N_{26}$ on so that the latch cannot change back to its original state until braking has been obtained and transistor $P_{11}$ turns off. These interlocks ensure that there is no possibility of breaking a fault current.

Because of residual magnetism in the motor it is desirable to ensure that the field current is reversed before the contactor RL3 is closed into the motoring position to prevent large uncontrolled currents being generating in the armature 51 and recirculating diode $D_9$. The I>O interlock then prevents changing back into braking unless the motoring field is applied to reset the magnetic circuit in the motor. By resetting the field before closing the contactor, the problem is avoided. During braking, when change over to motoring is demanded the MTR/BK signal goes high so that the collector of transistor $N_{31}$ goes low, the field reversal process takes place exactly as described above through gate G4 and latch $L_1$ after a delay for field forcing. The latch $L_2$ also changes at the same time and transistor $P_{15}$ turns on so that its collector goes high. This positive-going edge is transmitted through diode $D_{56}$, capacitor $C_{42}$ and resistor $R_{290}$ to turn on transistor $N_{32}$ which removes the base drive to transistor $N_{33}$ through diode $D_{59}$ so that transistor $N_{33}$ cannot turn on. The relay RL4 therefore stays de-energised and the contactor RL3 stays in the open (braking) condition until capacitor $C_{42}$ charges up and transistor $N_{32}$ turns off. During this delay, the $\overline{Q}$ output of the latch $L_2$ and the contact RL3b are out of phase so that gate G2 output is low and the armature demand is clamped by transistor $P_{11}$ supplying base current to transistor $N_{27}$ and $N_{28}$. The field reversing replay has already changed and a reset signal is provided by holding off the field clamp via diode $D_{58}$ and transistor $N_{32}$ so that transistor $N_8$ turns off and allows a small field demand to be made at the emitter of transistor $N_7$ (the demand is for a current of approximately 2 amps). Because the transistor $N_{32}$ serves the dual role of holding the contactor in braking and allowing a field current to flow in the correct (motoring) direction, the field resetting pulse must always occur at the right instant, i.e. after the field has reversed, but before the braking contact RL3 closes. When the transistor $N_{32}$ goes off, the brake contactor RL3 closes, the output of gate G2 goes high and the armature demand clamps are released after capacitor $C_{40}$ has discharged. The vehicle is then in the motoring mode with the magnetic circuit set in the right direction so that the recirculating diode $D_9$ is reverse biased. To ensure that the field pulse always occurs correctly, the duration of the motoring signal at transistor $N_{31}$ should be longer than the time required to change from braking to motoring. This is achieved by another capacitor-resistor network $C_{41}$, $R_{288}$ connected to the base of transistor $N_{31}$ to hold that transistor on when the collector of transistor $P_{15}$ goes high until the capacitor $C_{41}$ is charged. This delay is made slightly longer than the contactor hold-off delay produced by capacitor $C_{42}$ and resistor $R_{290}$, so that rapid changes from motoring to braking and back again do not interfere with the operation of the field reset circuits. The diodes $D_{55}$ and $D_{57}$ and the resistor $R_{289}$ also contribute by allowing capacitors $C_{41}$ and $C_{42}$ to discharge quickly after selecting braking ready for the next change into motoring.

An extra function of these components occurs on start up. In neutral transistor $P_8$ is on and holds transistor $N_{32}$ on via the resistor $R_{216}$. This holds the contactor in its braking condition and produces a small field current. If the vehicle is moving transistor $P_{16}$ will turn on transistor $N_{22}$ and prevent either forward or reverse being selected.

I claim:

1. A control system for a d.c. motor having an armature winding and a field winding, comprising control means for varying connections of said armature winding and/or field winding so as to enable the motor to operate in a plurality of different modes, armature current regulating means connected to vary the armature current, field current regulating means connected to vary the field current and speed interlock means for preventing an operation of said control means demanding a mode change that changes said connections from at least one motor operation enabling mode to at least one other such mode while the motor is running, the speed interlock means being sensitive to voltage across said armature winding, wherein the improvement comprises:

interlock control means which operate to control current in the field winding when said mode change is demanded, said interlock control means controlling said field current regulating means so as sequentially to cause the field winding current to be reduced to substantially zero and then to supply a controlled current pulse to said field winding, the speed interlock means acting to detect the armature voltage during said controlled current pulse.

2. A control system as claimed in claim 1 wherein said speed interlock means includes a rectifier connected to the armature winding and a means sensitive to the d.c. output of the rectifier.

3. A control system as claimed in claim 2 in which said means sensitive to the d.c. output of the recitifier includes and oscillator, an isolating transformer having its primary winding connected to the oscillator and a detector circuit connected to the secondary winding of the isolating transformer.

4. A control system as claimed in any one of claims 1, 2 or 3 wherein said interlock control means operates to supply said field wind with a fixed length current pulse of predetermined magnitude as said controlled current pulse.

* * * * *